United States Patent [19]

Sara

[11] 4,251,272
[45] Feb. 17, 1981

[54] OXIDATION RESISTANT POROUS ABRADABLE SEAL MEMBER FOR HIGH TEMPERATURE SERVICE

[75] Inventor: Raymond V. Sara, North Olmstead, Ohio

[73] Assignee: Union Carbide Corporation, New York, N.Y.

[21] Appl. No.: 973,437

[22] Filed: Dec. 26, 1978

Related U.S. Application Data

[63] Continuation of Ser. No. 922,521, Jul. 7, 1978, Pat. No. 4,155,755, which is a continuation of Ser. No. 835,240, Sep. 21, 1977, abandoned.

[51] Int. Cl.² ............................................. B22F 5/00
[52] U.S. Cl. ...................................... 75/200; 75/222; 415/174
[58] Field of Search ................... 75/200, 222; 415/174

[56] References Cited

U.S. PATENT DOCUMENTS

| | | | |
|---|---|---|---|
| 3,773,549 | 11/1973 | Elbert et al. | 117/129 |
| 3,817,719 | 6/1974 | Schilke et al. | 415/174 |
| 4,014,659 | 3/1977 | Hassler et al. | 75/200 |
| 4,080,204 | 3/1978 | Panzera | 415/174 |

Primary Examiner—Brooks H. Hunt
Attorney, Agent, or Firm—J. Hart Evans

[57] ABSTRACT

Porous abradable sintered metal structures suitable for use as abradable seals are rendered oxidation resistant and thus suitable for high temperature service by introducing into the porous structure an intermetallic compound of aluminum with one of chromium, titanium, cobalt and nickel, which compound is then thermally reacted with the porous metal structures to form an aluminum alloy in the structure.

10 Claims, 3 Drawing Figures

OXIDATION RESISTANT POROUS ABRADABLE SEAL MEMBER FOR HIGH TEMPERATURE SERVICE

This application is a continuation of our prior U.S. application Ser. No. 922,521 filed July 7, 1978 now U.S. Pat. No. 4,155,755, which is a continuation of application Ser. No. 835,240 filed Sept. 21, 1977 now abandoned.

IN THE INVENTION

This invention relates to porous abradable sintered metal structures of the type used in abradable seals for jet aircraft engines. More particularly it relates to improvements in such structures to render them more oxidation resistant and hence suitable for use in higher temperature applications.

Porous abradable sintered metal structures of such alloys as nickel and chromium have been successfully used in turbine engine compressor sections where temperatures of 650° C. to 870° C. may exist. At higher operating temperatures, however, such as those encountered in the higher temperature areas of jet aircraft engines, severe oxidation conditions exist which cause corrosion and erosion of these conventional porous abradable sintered metal structures whereby they spall away and disintegrate. Various attempts have been made to make such structures useful at high temperatures, including the use of glass or ceramics to fill and coat the metal surfaces. Such efforts have not proved entirely satisfactory however, because they have tended to detract from abradability without achieving the required service life in a high temperature environment.

It is known that nickel chromium alloys as well as most super alloys can be rendered more oxidation resistant by alloying them with aluminum. Technological problems associated with sintering prealloyed aluminum containing alloys, however, have heretofore prevented the fabrication of suitable aluminum containing porous abradable sintered metal structures. One aspect of the difficulties encountered is a stable $Al_2O_3$ oxide film which forms on the surface of aluminum containing particles, thereby impeding the diffusion which is essential to the sintering process. It is this same oxide film which renders an aluminum containing alloy more resistant to oxidation once the aluminum is introduced into the metal structure.

I have now discovered practical techniques for introducing aluminum into porous abradable sintered metal structures made from a nickel or cobalt based alloy. I employ an aluminum containing intermetallic compound which can be thermally reacted with the base alloy to yield an aluminum containing alloy. By adding sufficient aluminum to form an aluminum alloy comprising beta and gamma phases throughout the porous abradable sintered metal structure it is possible to achieve a high degree of oxidation resistance as the diffused aluminum upon exposure to air forms an oxidation resistant surface film of predominately $Al_2O_3$. The formation and diffusion distribution of the aluminum must be accomplished without destroying the porosity or abradability of the basic structure.

It is important that the base alloy and a sufficient quantity of the intermetallic compound be thermally reacted at a temperature which insures that the resulting aluminum containing alloy will comprise the gamma and beta phases. The gamma phase material is a face centered cubic nickel or cobalt rich solid solution and the beta phase a body centered cubic solid solution containing approximately equal amounts of aluminum and cobalt or nickel.

IN THE DRAWINGS

Figure 1:
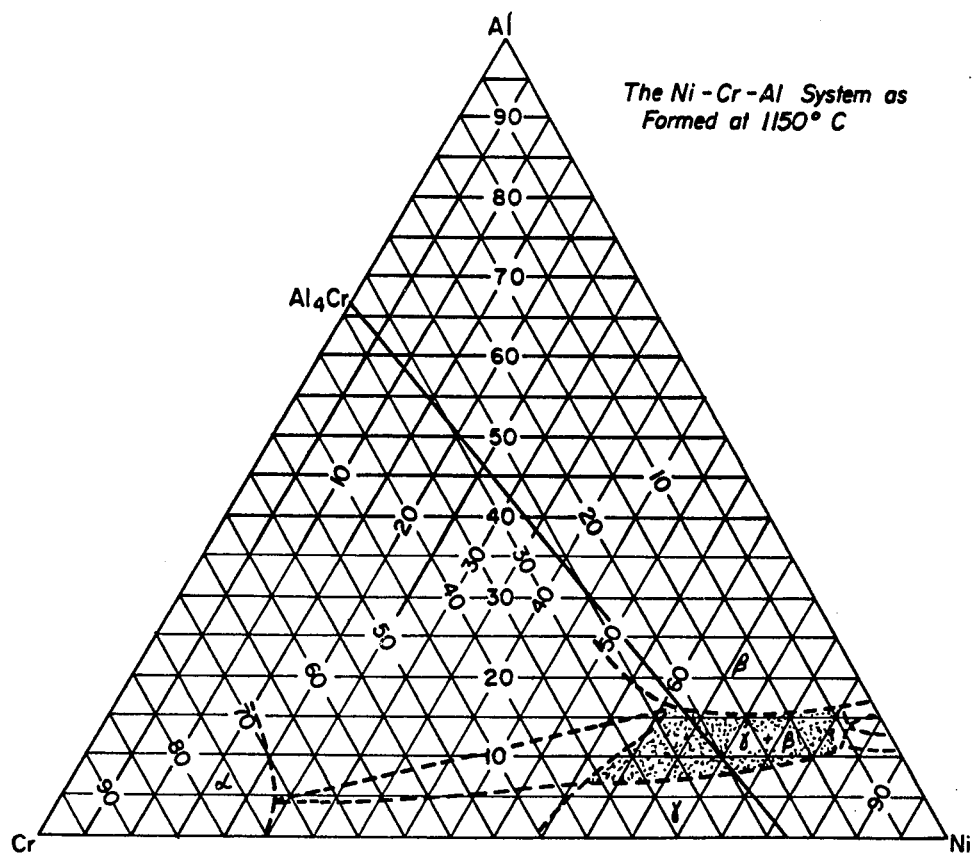
FIG. 1 is a ternary phase diagram of the nickel chromium aluminum alloy system at 1150° C.

In FIG. 1 the desired gamma and beta phase field of the nickel chromium aluminum alloy system is shown as the shaded area. The line indicating the join of the preferred alloy material for the porous abradable sintered metal structure alloy formed by the thermal reaction of $Al_4Cr$ with an 80% nickel 20% chrome base alloy is shown and can be seen to cross the area of the beta and gamma phases.

Figure 2:
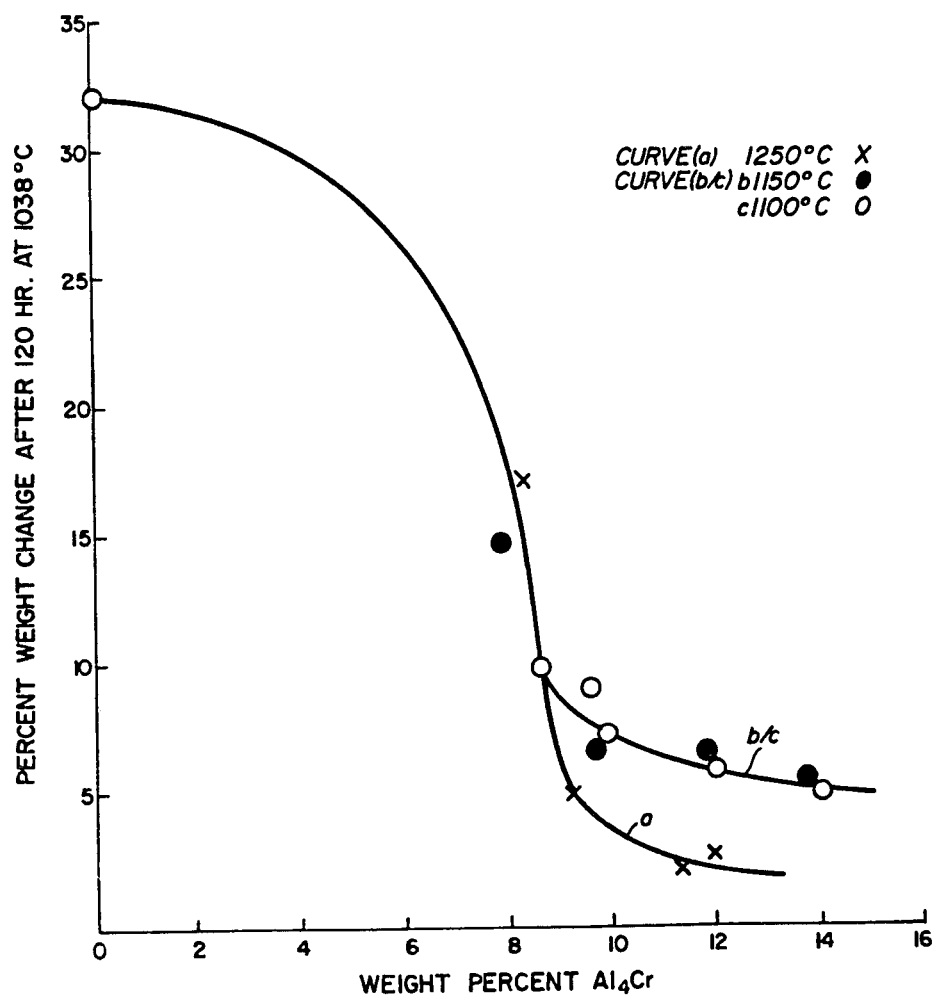
FIG. 2 is a graph showing the oxidation resistance of a nickel chromium alloy reacted with varying percentages of $Al_4Cr$ intermetallic compound.

The graph of FIG. 2 was drawn by plotting the weight change due to oxidation of samples of porous abradable sintered metal structure alloys formed by reacting varying amounts of $Al_4Cr$ with an 80 percent nickel 20 percent chromium base alloy porous abradable sintered metal structure. The beta was obtained using the procedures of Example I below. The $Al Cr_4$ intermetallic powder which had a particle size less than 30 microns was added to isopropyl alcohol in the ratio of one gram of powder to 10 cubic centimeters of alcohol. The porous abradable sintered metal structure test samples were shrouded in a porous non-woven plastic fabric, immersed briefly in an agitated slurry suspension of the intermetallic powder in the alcohol, then removed and dried at 80° C. This sequence was repeated until the desired quantity of intermetallic compound was introduced into the sintered metal base structure. The samples where then heated at temperatures of 1150° C., 1200° C. and 1250° C. for 4 hours in a purified helium atmosphere to thermally react the intermetallic powder with the sintered metal base alloy and form the porous abradable sintered metal structure alloy.

Each test sample was then heated in air for 120 hours at a temperature of 1038° C. The results are plotted as two curves in FIG. 2. The lower curve (a) refers to samples reacted at 1250° C. which is above the solidus temperature. Curve (b/c) drawn from the data for the samples thermally reacted at 1150° C. (b) and 1200° C. (c), which is below the solidus temperature. It can be seen that the limited melting at 1250° C. improves oxidation resistance. Alloy compositions with more than approximately 10 weight percent of $Al Cr_4$ are predominately two phases, gamma and beta, and they are the most oxidation resistant.

Figure 3:
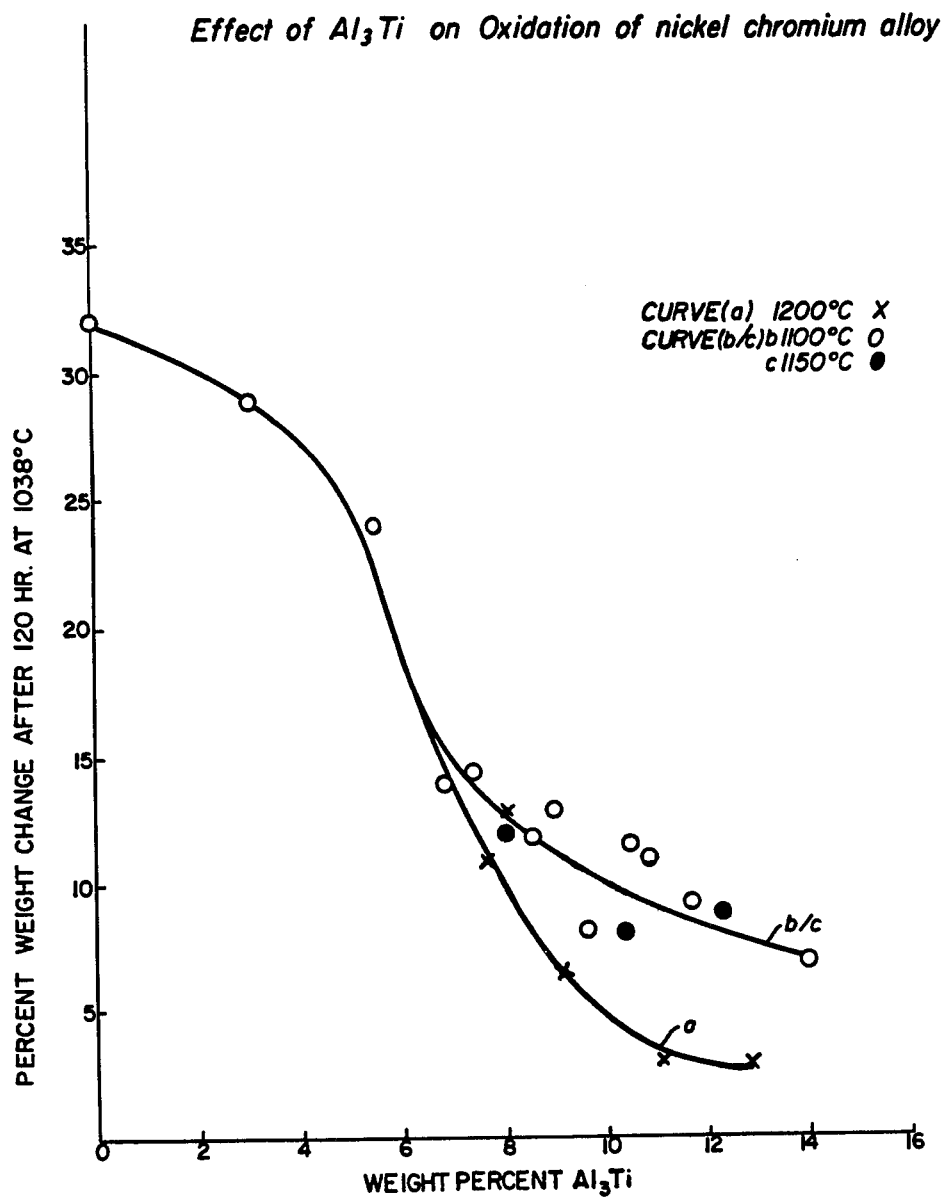
FIG. 3 is a graph showing the oxidation resistance of a nickel chromium alloy reacted with varying percentages of $Al_3Ti$ intermetallic compound.

The graph of FIG. 3 was obtained by procedures similar to those used to plot the graph of FIG. 2. The base alloy was also 80 percent nickel and 20 percent chromium and the intermetallic compound added was $Al_3Ti$. The $Al_3Ti$ powder was added to isopropyl alcohol in the ratio of 1 gram to 10 cubic centimeters and after immersion and drying the specimen samples were heat treated at 1100° C., 1150° C. and 1200° C. for 4 hours in purified helium. Curve (a) was plotted from the 1200° C. specimens and curve (b/c) from the 1100° C. (b) and the 1150° C. (c) specimens, all after heating in air at 1038° C. for 120 hours. It was evident from microscopic examination that liquid phase formed at the highest temperatures. A specimen sample infiltrated with 13 weight percent of Al₃Ti and subsequently heated at 1200° C. was subjected to a 500 hour oxidation test. A weight gain of less than 6 percent was recorded for this porous material indicating good oxidation resistance.

The base alloy for the porous abradable sintered metal structure can be nickel chromium or cobalt chromium or mixture thereof. The nickel can range from close to 100 percent by weight to as little as about 50 percent by weight.

The intermetallic compound added to get the aluminum into the structure and form the porous abradable sintered metal structure alloy is a compound of aluminum with chromium, titanium cobalt or nickel, or a mixture of two or more such compounds. Suitable compounds include $Al_7Cr$, $Al_{11}Cr_2$, $Al_4Cr$, $Al_3Cr$, $Al_9Cr_4$, $Al_8Cr_5$, $Al\ Cr_2$, $Al_3Ti$, $Al\ Ti$, $Al_9Co_2$, $Al_{13}Co_4$, $Al_5Co_2$, $Al\ Co$, $Al_3Ni$, $Al_3Ni_2$ and $Al\ Ni$. The proportion of intermetallic compound added should be at least 7 weight percent of the base alloy weight. The maximum amount of intermetallic which can be effectively employed will vary with the particular compound but in general I have found that about 14 weight percent is quite effective.

In the preferred method of treating an existing porous abradable seal to add an intermetallic compound the porous abradable sintered metal structure is briefly immersed in a suspension of the intermetallic powder in an anhydrous organic fluid. The intermetallic powder particles must be small enough to thoroughly infiltrate the pores of the porous abradable sintered metal structure. A powder size below 50 microns should be employed. Individual particles as small as 1 or 2 microns can be used and the smaller sizes are preferred. Suitable fluids include isopropyl alcohol, benzene, acetone methyl alcohol, ethyl alcohol and the like. A slurry suspension of from 0.25 to 3 grams of powder per 10 cubic centimeters of solvent is suitable and it has been found that about one gram per 10 cubic centimeters is particularly effective. If desired a porous, non-woven plastic fabric shroud can be wrapped around the structure during immersion to improve the uniformity of powder distribution. Slowly rotating the structure during drying can also be used to improve uniformity. The immersion and drying is repeated as often as needed to build up the percentage of intermetallic desired in the structure.

Heating is then necessary to alloy the intermetallic compound with the base alloy porous metal structure and form the structure alloy. A temperature of about 1050° C. is required and a temperature of about 1150° C. is preferred. The time required for the thermal reaction decreases at higher temperatures but a minimum of at least 15 minutes is required. A temperature of 1 to 2 hours is preferred.

Another method of making the desired oxidation resistant porous abradable sintered metal structure is to mix loose particles of the base metal alloy of chromium and nickel or cobalt with substantially smaller particles of the intermetallic powder. The intermetallic powder particles are preferably no more than one thirtieth the size on an individual particle volume basis, of the base alloy particles. It is important to physically blend the particles to the extent the powdered intermetallic compound particles are distributed over and imbedded in the surface of the larger base alloy powders. This prevents segregation by size during subsequent forming of the mixture to the desired shape prior to sintering.

Reaction sintering at temperatures of at least 1050° C. in an inert atmosphere such as argon or a vacuum is employed to form the porous abradable sintered metal structure alloy. Somewhat higher temperature such as 1200° C. is preferred. The examples which follow are illustrative of the invention but do not limit it to less that what is claimed.

EXAMPLE I

The starting material was a porous, abradable sintered metal structure of a base alloy consisting of 80 weight percent nickel and 20 weight percent chromium and measuring 8.9 centimeters by 1.9 centimeters by 0.3 centimeters. This structure was made by the method described in U.S. Pat. No. 4,049,428. The structure was wrapped in a porous nonwoven plastic fabric to improve uniformity of powder distribution and the wrapped block was then immersed for one minute in an agitated slurry suspension of 180 grams of less than 30 microns size $Al_4Cr$ powder in 1800 cubic centimeters of isoproply alcohol. The structure was removed and dried by rotating it at 3 revolutions per minute for 15 minutes in an oven maintained at a temperature of 70° C. The weight pickup of $Al_4Cr$ powder as a result of the immersion was found to be one weight percent. The immersion and drying steps were then repeated with an additional one percent weight gain for each cycle of immersion and drying. The cycles were repeated until the structure had a total weight pickup of 14 weight percent, which is the approximate saturation limit for this type of alloy structure.

The structure containing 14 weight percent added $Al_4Cr$ was heated for 4 hours at a temperature of 1200° C. in purified helium. Subsequent examination of the microstructure revealed that $Al_4Cr$ diffusion into the base alloy structure particles was complete and that a two phase (gamma and beta) structure was formed. The beta phase was predominant on the perimeter of most particles. On the basis of electron microscope analysis, it was evident that the constituent elements were homogeneously distributed in the two phases. It was also determined that the aluminum concentration was greater in the beta phase than in the gamma while chromium was greater in the gamma and nickel was essentially the same in both phases.

A control sample of the nickel and chromium base alloy structure was heated in still air at a constant temperature of 1038° C. for 120 hours and was found to have undergone a weight gain of 32 percent. This weight increase for the control sample of base alloy indicates complete conversion of the nickel and the chromium to their respective oxides NiO and $Cr_2O_3$. A sample of the structure alloy material of this example with a 14 percent weight pickup of $Al_4Cr$ was heated in the same manner as the control sample and was found to have had a weight gain of only 5.1 percent. This indicates that the addition of the aluminum significantly reduced the oxidation rate of the base nickel chromium alloy, inasmuch as the weight gain upon heating under these conditions is a method of determining the level of oxidation of such materials.

EXAMPLE II

The starting material was a porous abradable sintered metal structure of a base alloy consisting of 80 weight percent nickel and 20 weight percent chromium and measuring 8.2 centimeters by 1.8 centimeters by 0.4 centimeters. This material was made by the method described in U.S. Pat. No. 4,049,428. The structure was wrapped in porous nonwoven plastic fabric to improve uniformity of powder distribution and the wrapped structure was then immersed for one minute in an agitated slurry suspension of less than 30 microns size $Al_3Ti$ powder in 1000 cubic centimeters of isopropyl alcohol. The structure was removed and dried by rotating it at 3 revolutions per minute for approximately 15 minutes in front of an open furnace maintained at a temperature of 400° C. The weight pickup of the structure as a result of the immersion was found to be approximately two percent. The immersion and drying steps were then repeated six additional times until a quantity of $Al_3Ti$ equal to 12.9 weight percent of the structure had been incorporated into the nickel chromium base alloy structure.

The intermediate $Al_3Ti$ powder was thermally diffused into the parent nickel chromium base alloy particles by heating at a temperature of 1200° C. in a purified helium atmosphere for 3.5 hours. Two phase (gamma and beta) were identified in the structure by microscopic examination. Some liquid developed at the processing temperature. Electron microprobe examination indicated that elemental distribution was uniform but nickel and chromium content were higher in the gamma phase than in the beta phase. Aluminum and titanium concentrations were higher in the beta phase than in the gamma.

A control sample of the nickel chromium base alloy starting material was heated in still air at a constant temperature of 1038° C. for 120 hours and was found to have undergone a weight gain of 32 percent. This weight increase for the control sample indicates complete conversion of the nickel and the chromium to their respective oxides NiO and $Cr_2O_3$. The structure alloy material example was heated in still air at a constant temperature of 1038° C. for 100 hours and was found to have undergone a weight gain of 2.6 percent. After heating for an additional 400 hours the weight gain increased to a total of 5.7 percent. This indicated that the addition of the aluminum significantly reduced the oxidation rate of the nickel chromium base alloy, inasmuch as the weight gain upon heating under these conditions is a method of determining the level of oxidation of such materials. The thin oxide film on the metal particles of the structure alloy which effectively reduced the oxidation rate was found to be predominately $Al_2O_3$, with $Cr_2O_3$ and $TiO_2$ present in lesser quantities. Analysis indicated that less than one-half of the aluminum content was converted to oxide at the end of 500 hours.

EXAMPLE III

To loose nickel and chromium base alloy powder was added 15 weight percent of $Al_7Cr$ powder and the mixture was well blended prior to reaction sintering. The nickel and chromium base alloy was 150/250 mesh particles and the $Al_7Cr$ was less than 400 mesh. A can containing the powder and a small length of chain was roll blended for at least 24 hours. The small hard intermetallic $Al_7Cr$ particles became imbedded in the softer base alloy particle surface as a result of this blending. Segregation, due to particle size differences, was effectively curtailed in such blends. The mixture was poured into a picture frame cavity measuring 1.5 inches by 3.0 inches by 0.1 inches. Excess powder on the exposed surface was removed with a single stroke of a flat metal blade. Three different samples were reaction sintered at a temperature of 1225° C. in pure argon for periods of 1, 2 and 4 hours respectively to form the structure alloy of nickel chromium and aluminum.

These specimens had shrinkages of 2 to 3 percent depending on direction. Bulk density was approximately 3 grams per cubic centimeter which corresponds to 57 percent porosity. The average tensile strength of each specimen was 621, 1429 and 2176 pounds per square inch for three specimens sintered 1, 2 and 4 hours respectively. From the results of an abradability test comprising a rotating metal blade pressed against the specimen to simulate a rotating jet engine turbine blade. The two lowest tensile strength specimens were rated as having good abradability while the high strength specimen was rated average. This latter specimen differed from the first two in that slight smearing developed on the surface after interacting with a rotating knife edge.

A specimen made as above with 15 weight percent $Al_7Cr$ powder added to nickel chromium base alloy powder and specimens made with 8.25, 12.0 and 18.0 weight percent $Al_7Cr$ were reaction sintered in a pure argon atmosphere for one hour at a temperature of 1225° C. to form structure alloys. All four specimens of structure alloy were heated in air at a temperature of 1038° C. for 120 hours with resultant weight pickup of 18.7 percent for the 8.25 percent $Al_7Cr$ specimen, 7.8 percent for the 12.0 percent specimen, 5.0 percent for the 15 percent specimen and 5.8 percent for the 18.0 percent specimen. A control specimen of all nickel chromium base alloy powder similarly heated and sintered had a weight pickup of 32 percent. The 15 weight percent $Al_7Cr$ structure alloy specimen which had the lowest oxidation rate was a good abradable material as shown by this example.

What is claimed is:

1. Method of rendering a porous, abradable sintered metal structure comprising a base alloy of chromium with nickel or cobalt sufficiently oxidation resistant to be used at temperatures up to about 1050° C. without substantial loss of strength, porosity or abradability which comprises introducing into said porous sintered metal structure at least one powdered intermetallic compound of aluminum and an element selected from the group consisting of chromium, titanium, cobalt and nickel, the particles of said intermetallic compound powder being substantially smaller than the average pore size of said porous sintered metal structure, heating said metal structure to a temperature sufficient to cause said intermetallic compound to react with said base alloy to form a structure alloy of aluminum and chromium with at least one metal selected from the group consisting of nickel, cobalt and titanium, which structure alloy is substantially all beta and gamma phases.

2. A method according to claim 1 wherein the quantity of intermetallic compound introduced into said porous sintered metal structure is at least 7 weight percent of said porous sintered metal structure before said introduction.

3. A method according to claim 1 wherein the quantity of intermetallic compound introduced into said porous sintered metal compound is about 14 weight percent of said porous sintered metal structure before said introduction.

4. A method according to claim 1 wherein said base alloy comprises nickel and chromium.

5. A method according to claim 1 wherein said base alloy comprises chromium and cobalt.

6. A method according to claim 1 wherein said intermetallic compound is an aluminum chromium compound.

7. A method according to claim 1 wherein said intermetallic compound is an aluminum titanium compound.

8. A method according to claim 1 wherein said intermetallic compound is an aluminum cobalt compound.

9. A method according to claim 1 wherein said intermetallic compound is an aluminum nickel compound.

10. A method according to claim 1 wherein said intermetallic compound is at least one selected from the group consisting of $Al_7Cr$, $Al_{11}Cr_2$, $Al_4Cr$, $Al_3Cr$, $Al_3Cr$, $Al_9Cr_4$, $Al_8Cr_5$, $AlCr_2$, $Al_3Ti$, $AlTi$, $Al_9Co_2$, $Al_{13}Co_4$, $Al_5Co_2$, $AlCo$, $Al_3Ni$, $Al_3Ni_2$ and $AlNi$.

* * * * *